May 1, 1951     O. MITCHELL ET AL     2,551,501
VAPORIZER FOR FUEL GASES

Filed Dec. 19, 1946     2 Sheets-Sheet 1

INVENTORS:
ORVILLE MITCHELL
WILLIAM P. FREEMAN, JR.

ATTORNEYS.

May 1, 1951
O. MITCHELL ET AL
2,551,501
VAPORIZER FOR FUEL GASES
Filed Dec. 19, 1946
2 Sheets-Sheet 2
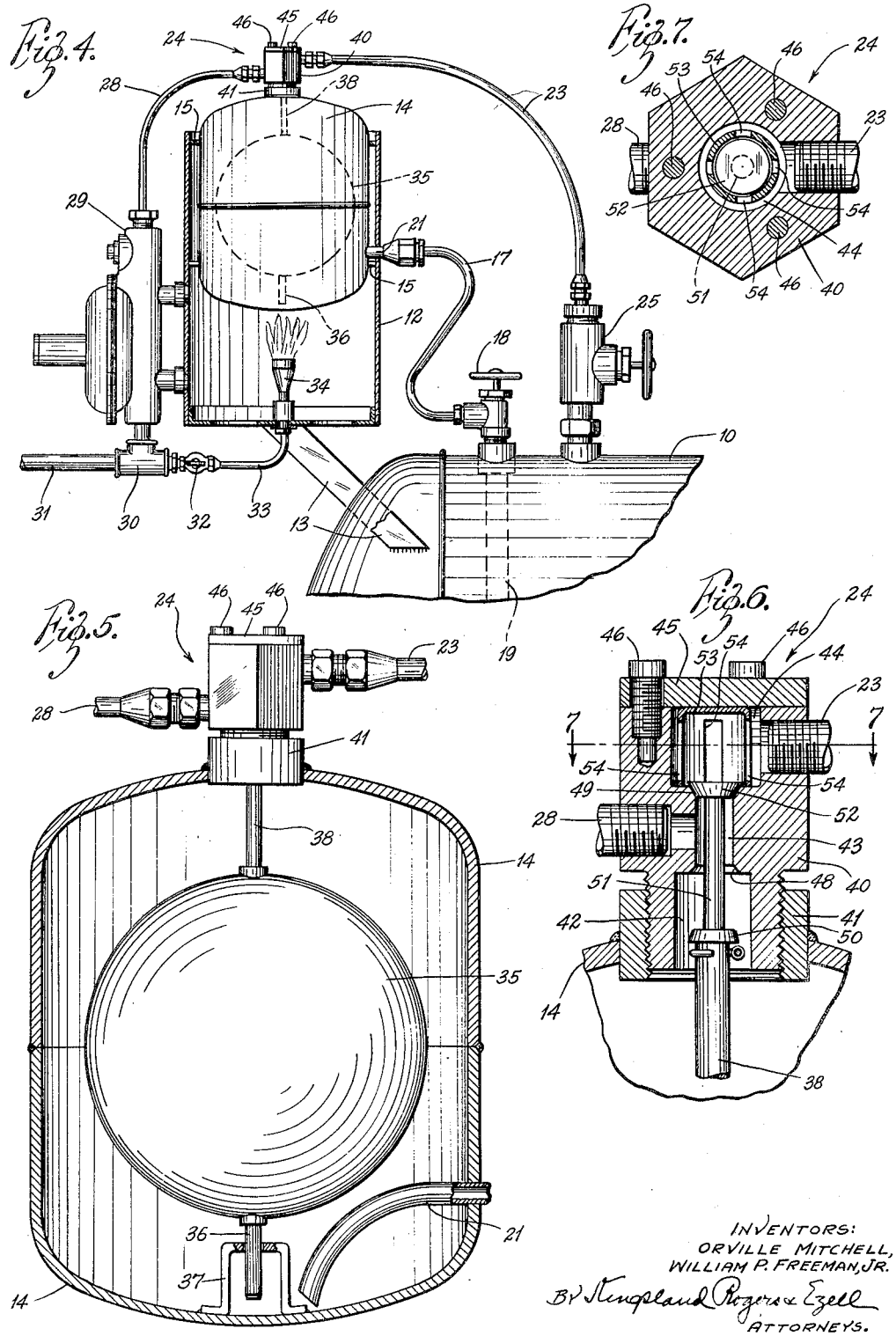
INVENTORS:
ORVILLE MITCHELL,
WILLIAM P. FREEMAN, JR.
BY Kingsland Rogers & Ezell
ATTORNEYS.

Patented May 1, 1951

2,551,501

UNITED STATES PATENT OFFICE 2,551,501

VAPORIZER FOR FUEL GASES

Orville Mitchell and William P. Freeman, Jr., Dallas, Tex., assignors to John E. Mitchell Company, Dallas, Tex., a corporation of Missouri Application December 19, 1946, Serial No. 717,269

13 Claims. (Cl. 62—1)

The present invention relates to a vaporizer for fuel gases. In particular, it relates to a vaporizer combination used in deriving fuel gases from liquid butane propane mixtures, and the like.

It is an object of the invention to provide a vaporizer mechanism that derives liquid from a supply tank, vaporizes the same for use, is capable of deriving supplemental gas from the storage tank, and which has means to control in definite sequence the delivery of gas generated by the vaporizer to the supply line and gas derived from the top of the storage tank to the supply line. A particular object of the invention is to provide a valve arrangement associated with a vaporizer that is controlled by mechanism that insures a proper sequence or order of delivery of generated gas to the supply line and gas from the storage tank to the supply line. A further object of the invention is to combine, with the foregoing, a means to prevent the flow of liquid into the supply line. Particularly, it is an object of the invention to provide means responsive to rise and fall of liquid level in a vaporizer to operate valves in such sequence that, when liquid level in the vaporizer rises, due to extremes of demands for gas, first supplemental gas from the storage tank to the supply line will be admitted and then, upon additional high demand, above the capacity of both sources of gas, the vaporizer will cut off from the supply line to prevent flow of liquid thereinto, together with a reverse cycle wherein, as the demand reduces, the valve to the vaporizer chamber will be reopened, and thereafter the valve to the storage tank will be reopened.

In the drawings:

Fig. 4 is an elevational view of the vaporizer mechanism of Fig. 1, with the outer cover thereof shown in vertical section;

Fig. 5 is a vertical section through the vaporizer chamber itself;

Fig. 6 is a vertical section through the control valve of the vaporizer chamber; and Fig. 7 is a section on the line 7—7 of Fig. 6.

Figure 1:
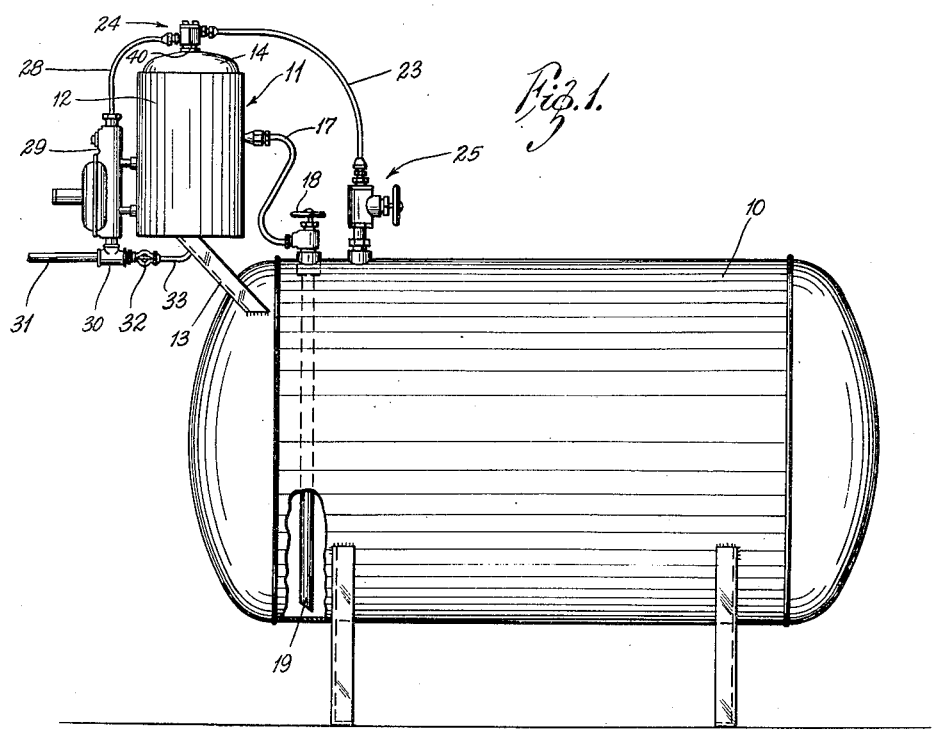
Fig. 1 is an elevation of the combination of storage tank and vaporizer.
Figures 2, 3:
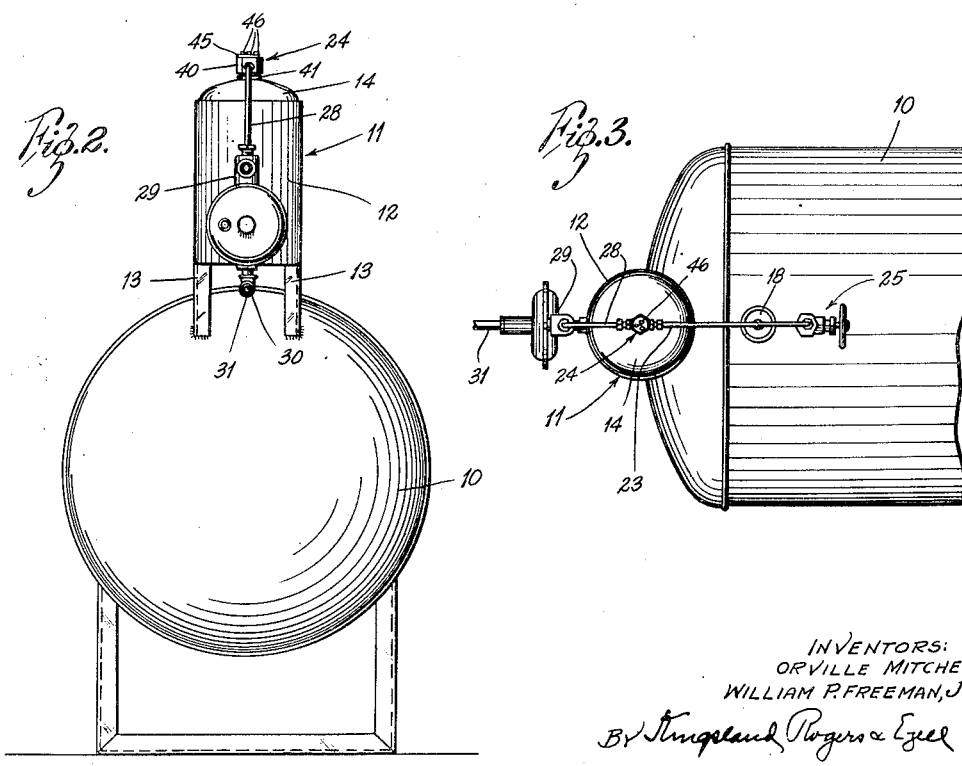
Fig. 2 is an end view of the mechanism, taken from the left end of Fig. 1.
Fig. 3 is a plan view of the mechanism shown in Fig. 1, with the storage tank broken away.

A storage tank 10 is provided for the storage of liquid butane propane mixture or other like liquid that is volatile and capable of producing gas. As is known, such liquid produces a gas above the liquid level within the storage tank 10.

Connected with the storage tank is a vaporizer unit, generally indicated at 11. This unit includes an outer shell 12 supported by brackets 13 upon the upper end of the storage tank 10. It will be understood that, while advantage results from mounting the vaporizer above the tank 10, there are certain installations where it may be mounted so that a liquid level can be established by gravity in the vaporizer chamber from the tank. The shell supports a vaporizer chamber 14 by means of brackets 15 that extend between the shell 12 and the tank 14, but do not obstruct the upflow of gas around the tank 14.

The lower part of the tank 14 is connected to the storage tank 10 by a pipe 17. This pipe extends through a manually or otherwise extraneously operated primary valve 18, preferably at the top of the storage tank 10, to a dip tube 19 that extends to the bottom of the storage tank 10. The other end of the pipe 17 extends in at 21 and terminates adjacent the bottom of the vaporizer chamber 14.

The vaporizer chamber 14 is connected to the tank 10 through a gas or vapor line 23. This pipe leads into a control valve mechanism, generally indicated at 24 and connected to the top of the vaporizing chamber 14. The lower end of the pipe 23 leads through a manually or otherwise extraneously controllable primary valve 25 that is connected into the top of the storage tank 10, so as to receive gas therefrom.

The valve mechanism 24 is connected by an outlet tube 28 that leads to a pressure regulator 29, the outlet of which is connected with a T 30. This T 30 has a main outlet work line 31 that may extend to a consuming device using the fuel gas. Such consuming device may be a burner for heating purposes, or may be an internal combustion exhaust heat device, or such other devices as are known in the art. The T 30 likewise has an outlet leading through a manual valve 32 to a pipe 33 that extends to a vaporizer burner 34. This burner is contained within the lower part of the shell 12, and is adapted to supply flame applied to the bottom of the vaporizer chamber 14.

The vaporizer chamber 14 contains a float 35 that has a lower stem 36 guided in a bracket 37 attached to the bottom of the vaporizer chamber 14. The upper end of the float 35 has a stem 38 projecting from it. This stem projects upwardly into the valve mechanism 24.

The valve mechanism 24 includes a valve housing or body 40 that is externally threaded on its lower portion to fit into a connector 41 permanently fixed into the top of the vaporizer chamber 14. The valve has a first inlet chamber 42 that opens into the top of the chamber 14. Above the inlet 42, there is a valve passage 43 extending upwardly and opening at its top into a second inlet chamber 44. This chamber 44 is closed by a cap 45 removably secured by screws 46.

The pipe 23 connects into the chamber 44. The outlet pipe 28 leads from the valve passage 43.

The valve passage 43 has a lower valve seat 48 at its entrance into the lower chamber 42. It has also an upper valve seat 49 at its connection with the upper inlet chamber 44.

The two valve seats are adapted to cooperate with valves disposed on the top of the float stem 38. This stem has a lower valve 50 formed thereon and capable of closure with the lower valve seat 48. The stem has an extension 51 reduced so as not to obstruct flow through the valve passage 43. At the upper end of the stem 51, there is an upper valve 52 that is adapted to cooperate with the valve seat 49. The two valves 50 and 52 are maintained in spaced relation by the valve stem 51. The upper valve is adapted to stabilize the operation of the float. When the float is down so that the upper valve 52 is closed on its seat 49, the flow will be stabilized by it and by the lower guide rod 36. If the float rises, the valve 49 is guided in a slotted guide 53 that has a plurality of axially extending slots 54 therein. These slots insure flow past the valve 52 when it is open.

It is preferable to use spaced poppet valves in this arrangement, although other types of valves may be used. Other operating means for the valves than a float may also be used, such as thermostatic means responsive to the temperature changes caused by rise in liquid level in the chamber 14. However, the float arrangement is simplest and surest. The combination of float and valves may generally be referred to as control means.

*Operation*

At any initial starting time, the valves 18 and 25 are closed. The storage tank 10 is assumed to be filled with liquid and gas, the gas being at above atmospheric pressure in the top of the tank. The vaporizing chamber 14 and associated parts are empty of this gas.

The first operation is to open the valves 18 and 25. Conventionally, and as shown, these valves are manually operated. At this time, however, the float will be in its lower position owing to the fact that the chamber 14 is empty, so that the valve 52 is closed and the valve 50 open. The valve 52, being closed, prevents the flow of gas through the line 23 from the top of the storage tank 10 into the vaporizing chamber. At the start, there will be a quantity of vapor in the top of the dip tube and in the parts up to the valve seat of the valve 18. This is released through the pipe 17 and its end 21 into the chamber 14. It flows thence into the valve chamber 42 and the passage 43 out the outlet line 28 through the pressure regulator 29 to the T 30. From this point, it can flow into the work line 31, and part of it will pass by the valve 32, which is open, and the line 33 to the burner 34, where it is ignited.

As the gas that is thus available in the dip pipe 19 flows out into the work line 31 and the burner line 33, the gas pressure derived from it in the vaporizing chamber 14 will reduce. When this pressure falls to a value calculatably below the vapor pressure at the top of the storage tank 10, the latter pressure will force liquid from the bottom of the storage tank through the dip tube 19 and the pipe 17 to discharge by the nozzle-like end 21 into the bottom of the vapor chamber 14. This liquid is then vaporized by the flame at 34 and generates further gas that flows out the line 28 through the pressure regulator 29, and thence to the work line and to the flame line to support the flame at the burner 34.

Under a normal operation, the burner will generate the full amount of gas required by the work line and the burner line. If the withdrawal by the work line 31 declines, so that there is more gas generated than is required, the gas pressure within the upper part of the vaporizing chamber 14 above the liquid level will rise. It will attain sufficient pressure to force the liquid in the vaporizing chamber 14 downwardly and repel it backward through the pipe 21, the pipe 17 and the dip tube 19 into the tank 10. As the liquid level is thus driven down, the amount of liquid in contact with the particularly hot and vaporizing portions of the vaporizing chamber 14 will be reduced, and consequently the amount of gas generated by the burner in the vaporizing chamber will be reduced. A position of equilibrium will obtain wherein the amount of gas generated equals the amount of consumption.

Conversely, if the draw-off by the work line 31 exceeds the amount of gas generated in the vaporizer, the pressure in the top of the vaporizer chamber 14 above the liquid level will reduce, permitting an increased amount of liquid to flow into the vaporizing chamber from the line 17 under the action of the pressure of gas at the top of the tank 10. This will provide more liquid available in the hot portions of the vaporizing chamber 14, and consequently will cause a larger amount of gas to be generated and delivered to the work line 31.

Thus it will be seen that the vaporizing chamber automatically delivers the proper amount of gas to the work line, despite the variations therein within a normal range of operation.

If the consumption by the work line 31 is reduced very greatly, the pressure in the top of the vaporizing chamber 14 may rise sufficiently to expel all of the liquid back into the line 17, after which the amount of vaporization will fall to zero in the vaporizing chamber. It will be understood that the line 17 does not become hot enough to generate any significant amount of gas, and that, in any case, no generation takes place within the tank 10 as a result of the influence of the heat of the burner 34.

The float 35 is designed to respond to certain variations in liquid level within the vaporizing chamber 14. However, within normal ranges of operation of the device and normal consumptions of gas within the line 31, the liquid level in the vaporizing chamber 14 will not lift the float 35 to open the valve 52. In other words, the normal range of liquid level within the vaporizing chamber 14 is entirely within the lower part of this chamber.

If at any time the demand for gas at the line 31 exceeds the normal maximum that can be delivered by the generation within the vaporizing chamber 14, the pressure of gas within the chamber will lower to such a point that an amount of liquid is forced into the chamber through the pipe 17 that causes the float to rise. Under such conditions, the valve 52 will be opened, and vapor from the top of the supply tank 10 can then pass from the line 23 to the valve chamber 44, around the valve 52 and the seat 49, into the valve passage 43 and out the line 28 to augment the supply of gas generated in the vaporizer chamber 14.

When the foregoing augmentation of the generated supply of gas is effected by the opening of the valve 52, the pressure conditions are relatively low in the upper part of the chamber 14. Necessarily, they are lower than the gas pressure conditions in the top of the supply tank 10, because the principal source of pressure forcing liquid into the vaporizing chamber, and establishing therein a liquid head greater than that in the tank 10, is the gas pressure at the top of the tank 10. The pressure difference can be measured in terms of the difference in liquid head between the vaporizing chamber 14 and the supply tank 10, the liquid within the vaporizing chamber 14 acting to increase the pressure within the tank 10 when the tops of the chamber 14 and the tank 10 are in communication past the valve 52. Hence the gas pressure is always greater than that in the vaporizer chamber 14, and, when the valve 52 opens, flow through the line 23 will always be away from the tank. If the pressure in the tank 10 declines, the liquid level in the vaporizing chamber 14, sustained by the greater gas pressure in the tank 10, will likewise fall, and the amount of vapor generated by the burner will fall, because less liquid is in contact with the heating surfaces of the chamber 14. The reduction in generated gas will further reduce the gas pressure within the chamber 14, so that it always remains below that in the top of the tank 10 and there can be no back flow through the line 23.

If the amount of gas generated by the vaporizing chamber 14, with the float raised and the valve 52 open, is still below the requirement of the work line 31, there might be a tendency for the liquid level in the vaporizing chamber 14 to rise so high that liquid would flow into the pipe 28. However, before this can occur, the float will have risen sufficiently to close the valve 50 on the seat 48. When this occurs, no more gas can be delivered to the work line by the vaporization in the vaporizing chamber 14. Any increase in pressure that is produced in the vaporizing chamber 14 under such circumstances will depress the liquid level in the vaporizing chamber to a safe point before it produces reopening of the valve 50 by lowering of the float 35. The valve 50 may be caused to open and close in cycles when such conditions exist, but it will thereby maintain a maximum liquid level within the vaporizing chamber 14 and prevent the liquid from flowing out into the work lines.

When, under such extreme circumstances with the valve 50 closed and the valve 52 open, the demand by the work line 31 declines, the float will lower and the valve 52 will remain open. The float will thereafter continue in an intermediate condition with both valves 50 and 52 open so long as the maximum generation by the vaporizing chamber 14 cannot supply the demand, or until the vapor at the top of the tank is consumed and the pressure thereof falls to close the valve 52 as previously described. If thereafter the demand further declines to a normal range, the float will wall and will reclose the valve 52, cutting off the supply of gas from the top of the tank 10.

It will thus be seen that the float and its valves provide a definite sequence of connections for the delivery of gas from the vaporizing chamber and from the tank 10 to the work line. This order of operation includes the normal closure of the valve 52 during all normal operation and demands by the pipe 31. The initially abnormal demands for gas by the work line 31 produce an opening of the valve 52, so that the supply of gas generated by the vaporizing chamber 14 may be supplemented by gas from the top of the tank 10. If this demand continues to be inadequate, the valve 50 will ultimately be closed, checking off the flow of liquid into the pipe 28. Upon a reversal of the foregoing conditions, the demand will decline and the first thing that will happen will be the opening of the valve 50 and withdrawal of it from its seat. At a time subsequent thereto, the valve 52 will close and the normal operations continue.

It has been found that a float valve arrangement is most desirable for providing the foregoing functions. However, the control means may be varied, as will be understood in the art. It may be suggested that a thermostatic control responsive to the differences in temperatures at different levels of the vaporizing chamber 14 may be employed.

The disposition of the vaporizing chamber 14 at a higher level than that of the supply tank or reservoir 10 adds a feature of safety by requiring a determinable minimum pressure difference between the vapor in the tank 10 and that in the chamber 14, as a prerequisite to the presence of liquid in the vaporizing chamber. It has been described that the decline of tank vapor pressure, when the valve 52 is open, will be accompanied by a fall in liquid level in the vaporizing chamber. Hence, if the float sticks and the valve 52 cannot close upon reduction of tank vapor pressure, there cannot be a generation of gas in the vaporizing chamber that is delivered to the tank 10, because the liquid in the chamber 14 will all flow back into the tank 10 by gravity, including a siphoning of the final quantities from the vaporizing chamber 14. The elimination of liquid from the chamber 14 will stop the generation of gas.

Also, the disposition of the vaporizing chamber 14 above the liquid level in the tank 10 ordinarily insures a dry vaporizing chamber when the consuming device is inactive. Under such circumstances, the gas pressure in the chamber 14 will not reduce to a value below that in the tank 10, and the pressure difference of the gas pressure in the tank 10 over that in the chamber 14, requisite to raise liquid into the chamber, will not exist. This has an advantage in servicing the vaporizing unit.

What is claimed is:

1. A vaporizing system including a vaporizing chamber for connection with a storage tank of vaporizable liquid and vapor, the chamber having a liquid inlet near its bottom for connection with the liquid in the tank, and a vapor outlet adjacent its top, a valve mechanism at the vapor outlet, said valve mechanism having a vapor inlet for connection with the vapor in the storage tank, and having means responsive to the attainment of a predetermined level of liquid in the chamber regardless of the liquid level in the storage tank to connect its vapor inlet with the vapor outlet from the chamber, and means responsive to attainment of a higher level of liquid in the chamber to close off the vapor outlet of the chamber.

2. A vaporizing system including a vaporizing chamber for connection with a storage tank of vaporizable liquid and vapor, the chamber having a liquid inlet near its bottom for connection with the liquid in the tank, and a vapor outlet adjacent the top, control mechanism including a vapor inlet for connection with the vapor in the storage tank, said control mechanism having first valve means movable to open and close said vapor inlet, second valve means to limit the upper liquid level in the chamber, and means responsive to the liquid level in the chamber regardless of the liquid level in the storage tank to open the first valve means when the said liquid level attains a first predetermined value, and thereafter to operate the second valve means to prevent rise of the liquid level in the chamber beyond a second predetermined value.

3. A vaporizing system including a vaporizing chamber for connection with a storage tank of vaporizable liquid and vapor, the chamber having a liquid inlet near its bottom for connection with the liquid in the tank, and a vapor outlet adjacent its top, control mechanism including a vapor inlet for connection with the vapor in the storage tank, said control mechanism having first valve means movable to open and close said vapor inlet, second valve means to limit the upper liquid level in the chamber, a float responsive to the liquid level in the chamber alone to open the first valve means when the said liquid level attains a first predetermined value, and thereafter to operate the second valve means to prevent rise of the liquid level in the chamber beyond the said second valve means.

4. A vaporizing system including a vaporizing chamber for connection with a storage tank of vaporizable liquid and vapor, said chamber having a liquid inlet for connection with the liquid in the tank and a vapor outlet adjacent its top, a vapor inlet connected with the said vapor outlet, and adapted for connection with the vapor in the storage tank, said vaporizing chamber being constructed to vaporize liquid therein to establish a liquid level that is a function of outlet vapor pressure, operating means responsive to rise of said liquid level which accompanies a fall of said outlet pressure, means actuated by said operating means to open and close the vapor inlet from the vapor outlet, and adapted to open said vapor inlet only upon attainment of a predetermined fall of outlet pressure accompanied by rise of liquid level in the chamber, and means actuated by the operating means to prevent the rise of liquid in the chamber above a predetermined maximum level which is higher than that at which said vapor inlet is opened.

5. A vaporizing system including a vaporizing chamber for connection with a storage tank of vaporizable liquid and vapor, said chamber having a liquid inlet for connection with the liquid in the tank and a vapor outlet adjacent its top, a vapor inlet connected with the said vapor outlet, and adapted for connection with the vapor in the storage tank, said vaporizing chamber being constructed to vaporize liquid therein to establish a liquid level that is a function of outlet vapor pressure, operating means responsive to fall of said outlet pressure accompanied by rise of said liquid level, a dual valve means having connected valves, a pair of valve seats, one between the vapor inlet and the vapor outlet, the other between the chamber and the vapor outlet, operating means responsive to reduction of pressure in the chamber accompanied by rise in liquid level therein, to move the connected valves, said valves being spaced in such wise that the valve in the vapor inlet opens after said pressure is reduced and the liquid level rises a predetermined amount, and that the valve between the chamber and the vapor outlet closes after the pressure is reduced and the liquid rises a predetermined further amount.

6. A vaporizing system including a storage tank for containing vaporizable liquid and vapor, a vaporizing chamber, a liquid connection between the chamber and tank, the bottom of the chamber being disposed above the normal liquid level in the tank, a vapor outlet from the chamber, a vapor connection between the vapor outlet and the vapor in the tank, valve means normally closing said connection, the vaporizing chamber being adapted to be charged with liquid from the tank by the higher vapor pressure in the tank, and means responsive to changes in the liquid level in the vaporizing chamber caused by an increase in pressure differential beyond a predetermined value to open said valve means and admit vapor from the tank to the vapor outlet, whereby said pressure differential between the tank and chamber may be reduced, said means responsive to changes in liquid level caused by changes in the pressure differential having a device operative to prevent outflow of liquid from the chamber into the vapor outlet without preventing liquid flow in either direction between the chamber and the tank.

7. A vaporizing system including a storage tank for containing vaporizable liquid and vapor, a vaporizing chamber, a liquid connection between the chamber and tank, a vapor outlet from the chamber, a vapor connection between the vapor outlet and the vapor in the tank, valve means normally closing said connection, the vaporizing chamber being adapted to be charged with liquid from the tank and the level of liquid in the chamber being a function of the relative vapor pressures of the tank and chamber, a float in the chamber, two valves connected to and operated by the float at different elevations of the float, one valve being between the vapor connection and the vapor outlet and opened only when the float attains a first level, the second between the chamber and the vapor outlet, and closed when the float attains a maximum level above said first level.

8. A vaporizing system including a vaporizing chamber having a liquid inlet, a float in the chamber, a valve housing at the top of the chamber, said housing having vertically spaced and oppositely facing valve seats, a passage between the seats, a lower valve chamber at the lower end of the passage, an upper valve chamber at the upper end of the passage, an outlet from the passage between the seats, the lower valve chamber being connected into the top of the chamber, the upper valve chamber having a vapor inlet, a float in the chamber, a stem extending from the float through the lower valve chamber, the passage and into the upper valve chamber, a lower valve on the stem cooperable with the lower valve seat, an upper valve on the stem in the upper valve chamber, said valves being spaced apart on the stem, so that with the float below a first level the upper valve is closed and the lower is open, with the float above said first level, both valves are open, and with the float at a second level the lower valve is closed and the upper open.

9. A vaporizing system including a closed tank for vaporizable liquid and vapor, a vaporizing chamber, the bottom of the vaporizing chamber being above the normal maximum liquid level in the tank, a liquid connection including a tube extending below the liquid level in the tank, extending to the chamber, and turned downwardly to the bottom of the chamber, a primary valve in the liquid connection for extraneous operation, a control valve mechanism at the top of the chamber including a housing having a first valve chamber connected with the top of the vaporizing chamber, a second valve chamber spaced above the first, and a passage between the chambers having oppositely facing valve seats at its ends opening into said valve chambers, a vapor connection between the top of the tank and the second valve chamber, a primary valve in said vapor connection, a vapor outlet from said passage between the valve chambers, a work line connected to the vapor outlet, a burner below the vaporizing chamber connected with the vapor outlet, a float in the vaporizing chamber, a stem connected to the top of the float, extending upwardly through the first valve chamber, the passage, and into the second valve chamber, a lower valve on the stem in the first valve chamber, an upper valve on the stem in the upper valve chamber, the valves being held spaced from each other by the stem, the float being adapted to permit the upper valve to remain closed and the lower to remain open during normal vaporizing operations, the float being responsive to rise in liquid level as a function of enlarged vapor pressure difference between the tank and the vaporizing chamber, to rise, and upon attaining a first predetermined level to open the upper valve with the lower valve open, and upon attaining a higher predetermined level to close the lower valve with the upper valve open, and, upon descent, to first open the lower valve and thereafter close the upper valve.

10. A closed vaporizing system including a vaporizing chamber and a reservoir tank for containing volatile liquid, connections between the lower part of the chamber and the lower part of the tank to conduct liquid from the tank to the chamber, the liquid level in the chamber being subject to effects of vapor pressure in the reservoir tank, vapor pressure in the chamber above the liquid, and the relative liquid heads in the reservoir tank and chamber, an outlet from the chamber subject to varying vapor demand whereby the vapor pressure above the liquid in the chamber may be reduced and the liquid level may rise, valve means and valve operating means therefor that is operated in response to rise of liquid level in the chamber to cut off the outlet and prevent flow of liquid from the chamber into the outlet, passage means to connect the outlet with the tank above the liquid level therein, and passage control means to open and close the passage means, said passage control means being connected with the valve operating means to be controlled thereby.

11. A vaporizing system for use with a reservoir of volatile liquid including a vaporizer having a liquid inlet adjacent its lower end and a vapor outlet adjacent its upper end, a heat source for applying heat adjacent the lower end of the vaporizer, a port communicating with the vapor outlet and the upper part of the vaporizer, and adapted for connection with the upper part of the reservoir, valve means to control flow through the port from the reservoir, valve means to control flow from the vaporizer through the vapor outlet, means operably interconnecting said valves, and means for operating both of said valves in a predetermined order.

12. A vaporizing system for use with a reservoir of vaporizable material, including a vaporizer chamber, a liquid inlet into the chamber for connecting the chamber with the liquid in the reservoir, a vapor outlet for conducting vapor from the upper part of the chamber, a vapor passage for connecting the vapor outlet with the upper part of the reservoir, heating means to heat the chamber when there is liquid therein so as to produce vapor under pressure therein that produces a liquid level in the chamber of height varying with vapor pressure in the chamber, valve means for controlling said vapor outlet, valve means for controlling the vapor passage, means operable as said vapor pressure rises and falls in the chamber and as the liquid level therein rises and falls, to operate both of said valves.

13. A vaporizing chamber to contain liquid and vapor, a heat source for applying heat to the vaporizing chamber, a liquid inlet to the chamber, a valve housing having a first port connected with the upper part of the chamber, a vapor outlet, and a vapor inlet, a pair of oppositely facing valve seats, the first being in the first port between the chamber and the vapor outlet, the second being between the vapor inlet and the vapor outlet, a valve stem extending from the chamber through the first valve seat to adjacent the second valve seat, a first valve on the stem and moved toward the first valve seat by movement of the stem outwardly of the chamber, a second valve on the stem and moved toward the second valve seat by movement of the stem inwardly toward the chamber, and a float in the chamber and connected to the valve stem.

ORVILLE MITCHELL.
WILLIAM P. FREEMAN, Jr.

REFERENCES CITED

The following references are of record in the file of this patent:

UNITED STATES PATENTS

| Number | Name | Date |
|---|---|---|
| 1,736,933 | Morgan et al. | Nov. 26, 1929 |
| 2,072,713 | Folmsbee et al. | Mar. 2, 1937 |
| 2,190,366 | Mead | Feb. 13, 1940 |
| 2,371,231 | Duff | Mar. 13, 1945 |
| 2,449,118 | Holicer | Sept. 14, 1948 |